(12) United States Patent
Marutani et al.

(10) Patent No.: US 9,395,083 B2
(45) Date of Patent: Jul. 19, 2016

(54) IGNITION DEVICE

(75) Inventors: Youichi Marutani, Odawara (JP);
Yasunori Ashikaga, Yokohama (JP);
Syouji Itoh, Tokyo (JP); Akihiko Ogasawara, Azumino (JP)

(73) Assignee: IHI CORPORATION (JP)

( * ) Notice: Subject to any disclaimer, the term of this patent is extended or adjusted under 35 U.S.C. 154(b) by 268 days.

(21) Appl. No.: 13/498,967

(22) PCT Filed: Sep. 30, 2010

(86) PCT No.: PCT/JP2010/067034
§ 371 (c)(1),
(2), (4) Date: Mar. 29, 2012

(87) PCT Pub. No.: WO2011/040506
PCT Pub. Date: Apr. 7, 2011

(65) Prior Publication Data
US 2012/0196235 A1 Aug. 2, 2012

(30) Foreign Application Priority Data

Sep. 30, 2009 (JP) ................. P2009-226372
May 31, 2010 (JP) ................. P2010-125059

(51) Int. Cl.
*F23Q 7/08* (2006.01)
*F23Q 7/06* (2006.01)
(Continued)

(52) U.S. Cl.
CPC .............. *F23Q 7/06* (2013.01); *F01N 3/0256* (2013.01); *F01N 3/2033* (2013.01); *F01N 2610/03* (2013.01); *F01N 2610/107* (2013.01); *Y02T 10/26* (2013.01)

(58) Field of Classification Search
CPC ....... F01N 3/0256; F01N 3/2033; F23Q 7/06; F23Q 7/001; F23Q 11/00; F23Q 11/04; F23Q 11/06
USPC ........................................ 431/260
See application file for complete search history.

(56) References Cited

U.S. PATENT DOCUMENTS 644,683 A * 3/1900 Pumphrey ............... 431/220
1,977,436 A * 10/1934 French ................... 431/260
(Continued)

FOREIGN PATENT DOCUMENTS

CN 1759273 A 4/2006
DE 197 17 544 A1 10/1998
(Continued)

OTHER PUBLICATIONS

Chinese Office Action dated Nov. 21, 2013 in corresponding Chinese Application No. 201080043286.1 with English translation (12 pages).
(Continued)

*Primary Examiner* — Avinash Savani
*Assistant Examiner* — Deepak Deean
(74) *Attorney, Agent, or Firm* — Ostrolenk Faber LLP

(57) ABSTRACT

An ignition device that ignites a mixture including an oxidizer and fuel includes a heating element (1) that has a heat generation region (1a) generating formerly heat to a temperature above the ignition temperature of the mixture (Y) at a tip projected downward from an installation unit (100), a fuel holding unit (2) that encloses the heat generation region (1a), in which the heat generation region (1a) is installed inside thereof and has a through hole (2a) opened to an upper part thereof, and a surrounding wall (3) that forms a space (R) connected to the upper part of the through hole (2a) and has a flame ejection opening (3a) opened from the space (R) to the outside. According to the ignition device, an ignitability of the ignition device can be improved.

12 Claims, 7 Drawing Sheets

(51) Int. Cl.
*F01N 3/20* (2006.01)
*F01N 3/025* (2006.01)

(56) References Cited

U.S. PATENT DOCUMENTS

| | | | | |
|---|---|---|---|---|
| 4,424,671 A * | 1/1984 | Tokura | | 60/274 |
| 4,502,278 A * | 3/1985 | Stark | | F01N 3/0256 |
| | | | | 55/466 |
| 4,504,294 A * | 3/1985 | Brighton | | 55/502 |
| 4,531,363 A * | 7/1985 | Ludecke et al. | | 60/303 |
| 4,557,108 A * | 12/1985 | Torimoto | | 60/286 |
| 4,571,938 A * | 2/1986 | Sakurai | | 60/303 |
| 4,611,985 A | 9/1986 | Panick | | 431/240 |
| 4,651,524 A * | 3/1987 | Brighton | | 60/274 |
| 4,672,808 A | 6/1987 | Leonhard | | 60/286 |
| 4,951,464 A * | 8/1990 | Eickhoff et al. | | 60/274 |
| 5,094,075 A * | 3/1992 | Berendes | | 60/303 |
| 5,320,523 A * | 6/1994 | Stark | | 431/353 |
| 5,339,630 A * | 8/1994 | Pettit | | F01N 3/2033 |
| | | | | 431/354 |
| 5,605,453 A | 2/1997 | Kenner et al. | | 431/262 |
| 5,707,227 A | 1/1998 | Langen | | 431/261 |
| 6,726,114 B2 * | 4/2004 | Blaschke | | B01B 1/005 |
| | | | | 237/2 R |
| 7,926,262 B2 * | 4/2011 | Cox et al. | | 60/295 |
| 8,001,773 B2 * | 8/2011 | Winter et al. | | 60/295 |
| 2003/0097752 A1 * | 5/2003 | Shirk et al. | | 29/890 |

FOREIGN PATENT DOCUMENTS

| | | | |
|---|---|---|---|
| EP | 0 309 723 A1 | 4/1989 | |
| EP | 1 961 931 A1 | 8/2008 | |
| EP | 2 025 890 A1 | 2/2009 | |
| EP | 2484973 A1 | 8/2012 | |
| EP | 2 551 588 A1 | 1/2013 | |
| JP | 60-164108 | 8/1985 | |
| JP | 02-287006 | 11/1990 | |
| JP | 4-017212 | 2/1992 | |
| JP | 05-203115 | 8/1993 | |
| JP | 5-90162 | 12/1993 | |
| JP | 7-55113 | 3/1995 | |
| JP | 7-133926 | 5/1995 | |
| JP | 8-42850 | 2/1996 | |
| JP | 8-260944 | 10/1996 | |
| JP | 2002-13706 | 1/2002 | |
| JP | 2003-090512 | 3/2003 | |
| JP | 2003-139324 | 5/2003 | |
| JP | 2004-152587 | 5/2004 | |
| JP | 2007-154772 | 6/2007 | |
| WO | WO 2008/003519 A1 | 1/2008 | |

OTHER PUBLICATIONS

Office Action dated May 7, 2013 issued in corresponding Japanese Patent Application No. 2010-125059 with English translation.
Canadian Office Action, dated Sep. 9, 2013, issued in corresponding Canadian Application No. 2,776,193. Total 4 pages.
Extended European Search Report dated Feb. 13, 2013 issued in corresponding European Patent Application No. 10820621.0.
International Search Report mailed Nov. 2, 2010 in corresponding PCT International Application No. PCT/JP2010/067034.
Japanese Notice of Allowance, dated May 27, 2014, issued in corresponding Japanese Patent Application No. 2013-143074. English translation. Total 6 pages.
English Translation of the Written Opinion issued in PCT/JP2010/067034.
Written Opinion issued in PCT/JP2010/067034 dated Nov. 2, 2010 and an English language translation.

* cited by examiner

IGNITION DEVICE

CROSS-REFERENCE TO RELATED APPLICATIONS

The present application is a 35 U.S.C. §§371 national phase conversion of PCT/JP2010/067034, filed Sep. 30, 2010, which claims priority of Japanese Patent Application No. 2009-226372, filed Sep. 30, 2009, and Japanese Patent Application No. 2010-125059, and May 31, 2010, the contents of which are incorporated herein by reference. The PCT International Application was published in the Japanese language.

TECHNICAL FIELD

The present invention relates to an ignition device igniting a mixture including an oxidizer and fuel.

Particles (particulate matter) are included in the exhaust gas of a diesel engine or the like.

Since there is concern of an influence on the environment occurring due to the emission of the particles into the atmosphere, in recent years, a filter (DPF) for removing the particles in exhaust gas has been installed in a vehicle in which the diesel engine or the like is mounted.

The filter is formed by ceramics or the like having porous bodies that includes a plurality of holes smaller than the particles and blocks passage of the particles thereby performing collection of the particles.

However, if the filter is used for a long period, the collected particles are accumulated and the filter is in a clogging state.

In order to prevent clogging of the filter, for example, as described in Patent Document 1, a method of combusting and removing particles collected in the filter by supplying high temperature gas to the filter is used.

Specifically, in Patent Document 1, a burner device is installed between the diesel engine and the filter, a mixture in which an exhaust gas and fuel are mixed is combusted thereby generating a high temperature gas, and then the particles are combusted by supplying the high temperature gas to the filter.

CITATION LIST

Patent Document

[Patent Document 1] Japanese Patent Application, First Publication No. 2007-154772

SUMMARY OF INVENTION

Technical Problem

By the way, in the above-described burner device, a mixture in which fuel ejected from a fuel ejection device is mixed with exhaust gas or ambient air supplied as an oxidizer is generated and an ignition device heats the mixture to the ignition temperature or greater so that the mixture is combusted.

However, in a burner device, usually, a glow plug or a spark plug is used as the ignition device and a mixture is ignited at a very small heat generation region. For this reason, a burner device of the related art has a problem where the formed flame kernel is small, and in a case where the flow rate surrounding the heat generation region is fast, the flame kernel is blown out without developing, thus ignitability is reduced.

The invention has been made considering the above-described problem and an object thereof is to improve ignitability of an ignition device.

Solution to Problem

The invention employs the configurations below as means for solving the problems.

A first aspect of the invention employs an ignition device that ignites a mixture including an oxidizer and a fuel, includes: a heating element that projects downward from an installation unit and has a heat generation region generating heat to a temperature above the ignition temperature of the mixture at the end thereof; a fuel holding unit that encloses the heat generation region, in which the heat generation region is installed inside thereof and has a through hole opened to an upper part; and a surrounding wall that forms a space connected to the upper part of the through hole and has a flame ejection opening opened from the space to the outside.

A second aspect of the invention employs the ignition device according to the first aspect of the invention, wherein the fuel holding unit includes a second through hole that is opened to a direction in which the fuel is injected and communicates with the heat generation region.

A third aspect of the invention employs the ignition device according to the second aspect of the invention, wherein the second through hole has a diameter larger than that of the through hole.

A fourth aspect of the invention employs the ignition device according to the second aspect of the invention, wherein the second through hole passes through to a side opposite to a side where the fuel is injected, and the ignition device further includes a facing plate that is installed facing the opening of the second through hole that is formed at the opposite side thereof.

A fifth aspect of the invention employs the ignition device according to the first aspect of the invention, wherein the flame ejection opening is biased and formed to the side where the fuel is injected to the fuel holding unit.

A sixth aspect of the invention employs the ignition device according to the first aspect of the invention, further includes a second heat generation region that is installed in the space.

A seventh aspect of the invention employs the ignition device according to the first aspect of the invention, further includes an air supply unit that supplies the air to the heat generation region.

An eighth aspect of the invention employs the ignition device according to the first aspect of the invention, further includes a band unit that supports the fuel holding unit.

A ninth aspect of the invention employs the ignition device according to the eighth aspect of the invention, wherein the fuel holding unit is divided in a plurality of small pieces.

A tenth aspect of the invention employs the ignition device according to the eighth aspect of the invention, further includes a cushion material that is installed between the fuel holding unit and the band unit.

Advantageous Effects of Invention

According to the invention, the heat generation region generates heat so that the around of the heat generation region is heated and ascending current is generated the around of the heat generation region. As a result, the ascending current directing toward the upper part generates at the through hole of the fuel holding unit. Meanwhile, when the heat generation region generates heat, the fuel held in the fuel holding unit volatilizes and the volatilized fuel flows in the through hole of the fuel holding unit. Thus, due to the volatilized fuel that flows in the through hole and the ascending current that is formed inside the through hole, the ascending current is formed inside the through hole by the mixture having high concentration.

In addition, according to the invention, a space that is enclosed by the surrounding wall connected to the upper part of the through hole of the fuel holding unit is formed. A portion of the mixture is fired by heating of the heat generation region inside the through hole, and then the generated flame kernel rides the ascending current of the mixture and is supplied to the space. Accordingly, the flame kernel supplied to the space develops in the space and becomes a flame without blowing out. Accordingly, the flame formed in the space ejects to the outside of the surrounding wall via the flame ejection opening.

As described above, according to the invention, the flame kernel does not blow out due to fast speed so that the flame kernel can be reliably formed. In addition, the flame ejected from the flame ejection opening is stable and much larger than the flame kernel formed by the glow plug or the spark plug of the related art. Thus, it is possible to reliably ignite the mixture present around the ignition device.

Thus, according to the invention, the ignitability can be improved.

DESCRIPTION OF EMBODIMENTS

Figure 1:
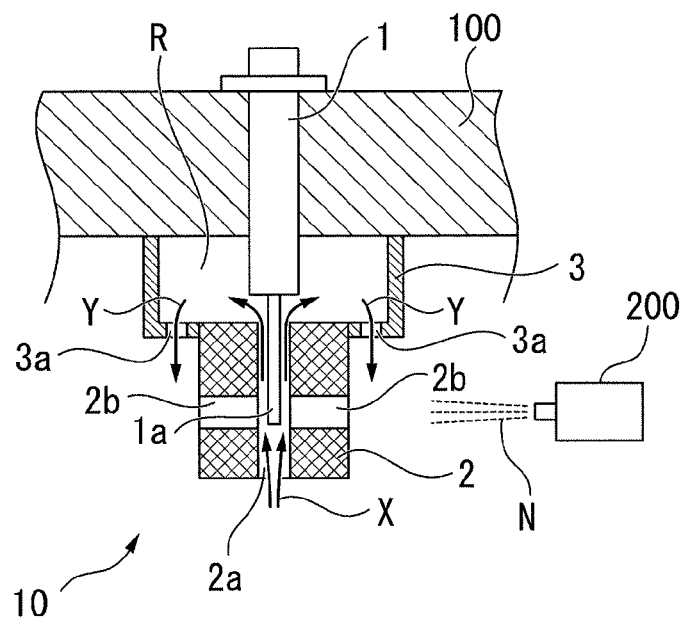
FIG. 1 is a cross-sectional view illustrating a schematic configuration of an ignition device of a first embodiment of the invention.

Hereinafter, an embodiment of an ignition device of the invention will be described with reference to drawings. In addition, in the drawings described below, in order for each member a recognizable size, the scale of each member is appropriately changed.

First Embodiment

Figure 2:
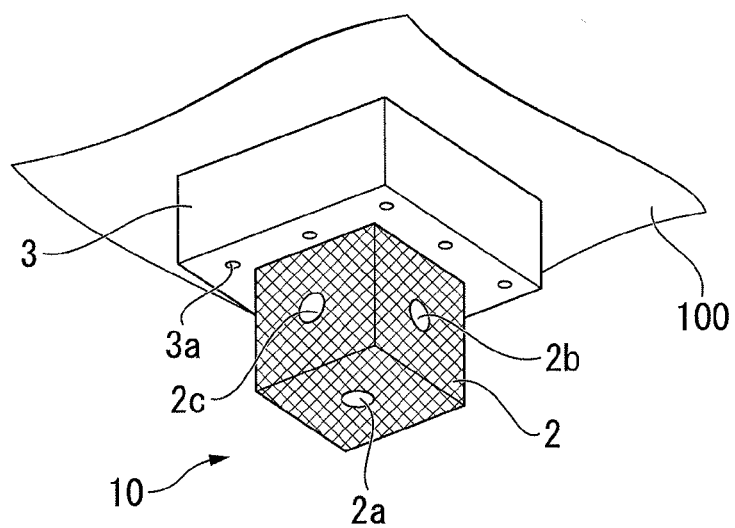
FIG. 2 is a perspective view illustrating a schematic configuration of the ignition device of the first embodiment of the invention.

FIG. 1 is a cross-sectional view illustrating a schematic configuration of an ignition device 10 of the embodiment. In addition, FIG. 2 is a perspective view illustrating a schematic configuration of the ignition device 10 of the embodiment.

The ignition device 10 is for igniting to a mixture including an oxidizer and fuel, and is installed, for example, at a burner device or in a pipe in which an exhaust gas usable as the oxidizer flows.

As shown in FIG. 1, the ignition device 10 includes a glow plug 1 (a heating element), a fuel holding unit 2 and a surrounding wall 3.

The glow plug 1 projects downward from the installation unit 100 (for example, a wall portion of the pipe or a wall portion of the burner device) of the ignition device 10 itself and, has a tip 1a that functions as a heat generation region that generates heat above the ignition temperature of mixture Y at the end thereof. In addition, a spark plug can be used instead of the glow plug 1.

As shown in FIG. 1, the fuel holding unit 2 holds the fuel, to which the fuel N ejected from a fuel ejection device 200 installed laterally is supplied. The fuel holding unit 2 is configured by porous bodies formed of metallic mesh, sintered metal, metallic fiber, glass cloth, ceramic porous bodies, ceramic fiber, pumice or the like.

In addition, the fuel holding unit 2 has a through hole 2a (a through hole) linearly passing through from a lower part to an upper part, a through hole 2b (a second through hole) linearly passing through from the fuel ejection device 200 side to the opposite side thereof and a through hole 2c passing through horizontally and orthogonally to the through hole 2b.

The through hole 2a, the through hole 2b and the through hole 2c cross one another at the center of the fuel holding unit 2, and the tip 1a of the glow plug 1 is installed at the crossing region. In other words, the tip 1a of the glow plug 1 is installed inside the through hole 2a, the through hole 2b and the through hole 2c.

As described above, the ignition device 10 of the embodiment has the through hole 2a where the tip 1a of the glow plug 1 is installed inside thereof and that opens to the upper part thereof, and the through hole 2b that opens to an injecting direction of the fuel N and communicates with the tip 1a of the glow plug 1.

A surrounding wall 3 forms a stagnation area R (a space) connected to the upper part of the through hole 2a included in the fuel holding unit 2, and simultaneously has a flame ejection opening 3a opened from the stagnation area R to the outside.

The surrounding wall 3 is installed between the fuel holding unit 2 and the installation unit 100, and is installed to enclose the fuel holding unit 2 further upward than the fuel holding unit 2. In addition, as shown in FIG. 2, the surrounding wall 3 is formed wide further to the outside than the fuel holding unit 2 and has a plurality of flame ejection openings 3a opened to the outside area of the fuel holding unit 2 toward the lower side thereof.

According to the ignition device 10 of the embodiment having the above-described configuration, the tip 1a of the glow plug 1 is heated thereby heating the circumference of the tip 1a and generating an ascending current surrounding the tip 1a. As a result, an oxidizer X (for example, the exhaust gas or the air) flows in the through hole 2a of the fuel holding unit 2 from below and the ascending current is generated inside the through hole 2a toward the upper side.

Meanwhile, when the tip 1a of the glow plug 1 generates heat, fuel N held in the fuel holding unit 2 volatilizes and the volatilized fuel N flows in the through hole 2a of the fuel holding unit 2. Accordingly, the ascending current is formed inside the through hole by the mixture Y having high concentration according to the volatilized fuel N that flows in the through hole 2a and the ascending current that is formed inside the through hole.

In addition, according to the ignition device 10 of the embodiment, the stagnation area R connected to the upper part of the through hole 2a of the fuel holding unit 2 is formed. A portion of the mixture Y is heated and then fired by the tip 1a of the glow plug 1 inside the through hole 2a so that the generated flame kernel rides on the ascending current of the mixture Y and then supplies to the stagnation area R. The stagnation area R is enclosed by the surrounding wall 3 so that the stagnation area R is a space isolated from the flowing outside the surrounding wall 3. Thus, the flame kernel supplied into the stagnation area R develops up in the stagnation area R and then becomes flame without blowing out. Accordingly, the flame formed in the stagnation area R ejects to outside the surrounding wall 3 via flame ejection opening 3a together with unburned mixture Y.

As described above, according to the ignition device 10 of the embodiment, the flame can be reliably formed by flowing of the flame kernel without blowing out by the quick current. In addition, the flame ejected from the flame ejection opening 3a is much stable and larger than the flame, kernel formed by the glow plug or the spark plug of the related art. Thus, it is possible to reliably ignite the mixture that is present surrounding the ignition device 10.

According to the ignition device 10 of the embodiment, the ignitability can be improved.

In addition, in the ignition device 10 of the embodiment, the fuel holding unit 2 includes the through hole 2b which opens to a direction in which the fuel N is ejected and simultaneously communicated with the tip 1a of the glow plug 1.

Thus, the fuel N is supplied directly to adjacent to the tip 1a of the glow plug 1 via the through hole 2b and the fuel concentration of the mixture Y can be further increased adjacent to the tip 1a of the glow plug 1. Thereby, the ignitability can be further improved.

The fuel N is supplied directly to adjacent to the tip 1a of the glow plug 1 via the through hole 2b so that liquid phase fuel N that does not heat to the ignition temperature adheres to the glow plug 1. Thus, it is possible to restrain overheat of the glow plug 1 and to extend operating life of the glow plug 1.

In the ignition device 10 of the embodiment, since the through holes are formed in the fuel holding unit 2 in multidirection, the oxidizer can be supplied from various through holes to the stagnation area R via tip 1a of the glow plug 1.

Thereby, even in a case where the ignition device 10 is inclined, inflow of the oxidizer into the stagnation area R can be secured and the ignitability can be stably exerted.

Second Embodiment

Next, a second embodiment of the invention will be described. In the description of the embodiment, portions similar to those of the above-described first embodiment are omitted or are simplified.

Figure 3A:
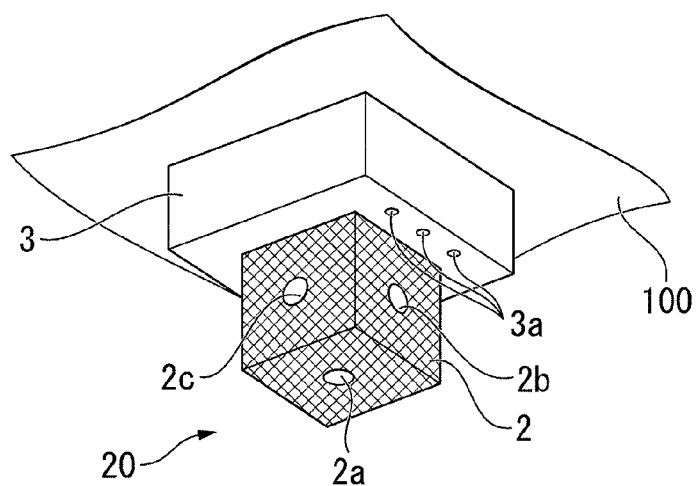
FIG. 3A is a perspective view illustrating a schematic configuration of an ignition device of a second embodiment of the invention.

FIG. 3A is a perspective view illustrating a schematic configuration of an ignition device 20 of the embodiment. As shown in the view, in the ignition device 20 of the embodiment, the flame ejection opening 3a is formed only the side of the fuel holding unit 2 where the fuel N is injected.

In other words, in the ignition device 20 of the embodiment, the flame ejection opening 3a is formed with biased toward the side of the fuel holding unit 2 where the fuel N is injected.

As described above, according to the ignition device 20 of the embodiment, since the flame ejection opening 3a is formed biased toward the side of the fuel holding unit 2 where the fuel N is injected, a large flame is ejected to the side of the fuel holding unit 2 where the fuel N is injected.

For this reason, the temperature of the side of the fuel holding unit 2 in which a large amount of fuel N is adhered, where the fuel N is injected is raised, volatilization of the fuel N can be promoted and the burning around the ignition device 20 can be stabilized after ignition.

Figure 3B:
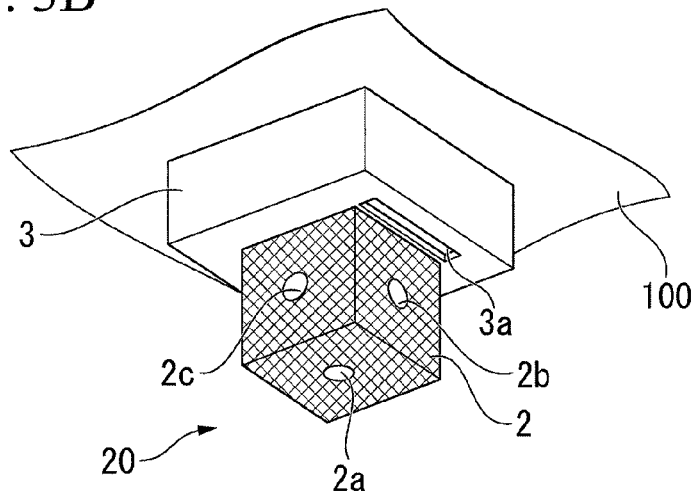
FIG. 3B is a perspective view illustrating a schematic configuration of the ignition device of the second embodiment of the invention.

As shown in FIG. 3B, the flame ejection opening 3a having a single rectangular shape may be installed instead of arranging a plurality of round flame ejection opening 3a.

Third Embodiment

Next, a third embodiment of the invention will be described. Even in the description of the embodiment, portions similar to those of the above-described first embodiment are omitted or are simplified.

Figure 4:
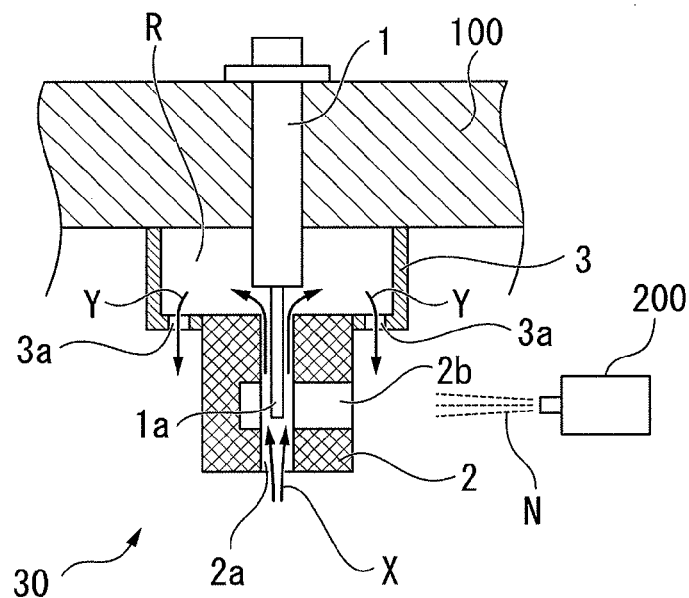
FIG. 4 is a cross-sectional view illustrating a schematic configuration of an ignition device of a third embodiment of the invention.

FIG. 4 is a cross-sectional view illustrating a schematic configuration of an ignition device 30 of the embodiment. As shown in the figure, the ignition device 30 of the embodiment makes the through hole 2b having a diameter larger than that of the through hole 2a. In addition, the through hole 2b is opened only to the direction in which the fuel N is ejected and the opposite side of the side where the fuel N is ejected is closed.

According to the ignition device 30 of the embodiment employing the above-described configuration, a portion of the flame developed at the stagnation area R can be ejected from the through hole 2b. A portion of the fuel N ejected to the fuel holding unit 2 can be heated and volatilized with the flame. Accordingly, the volatilization of the fuel N can be promoted and the burning around the ignition device 30 can be stabilized after ignition.

Fourth Embodiment

Next, a fourth embodiment of the invention will be described. Even in the description of the embodiment, portions similar to those of the above-described first embodiment are omitted or are simplified.

Figure 5:
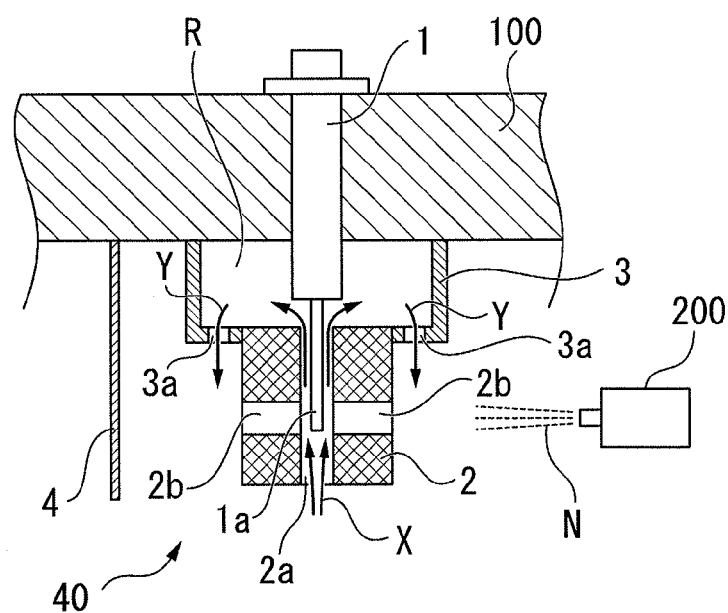
FIG. 5 is a cross-sectional view illustrating a schematic configuration of an ignition device of a fourth embodiment of the invention.

FIG. 5 is a cross-sectional view illustrating a schematic configuration of an ignition device 40 of a fourth embodiment of the invention. As shown in the view, the ignition device 40 of the embodiment includes the through hole 2b passing through to the opposite side of the side of the fuel holding unit 2 where the fuel N is ejected. In addition, a facing plate 4 is installed facing an opening that is opposite to the side of the through hole 2b where the fuel N is injected.

In other words, the facing plate 4 is facing the fuel holding unit 2 where the opening of the through hole 2b is formed with keeping the flame ejection opening 3a of the surrounding wall 3 there between.

The facing plate 4 receives the fuel N that reaches the facing plate 4 via through hole 2b. Thus, it is preferable that the facing plate 4 be formed with the porous bodies such as for example, a fire-resistant mesh plate or the like where adhered fuel is easily volatilized.

According to the ignition device 40 of the embodiment employing the above-described configuration, a portion of the fuel N ejected from the fuel ejection device 200 arrives and adheres to the facing plate 4 via through hole 2*b*.

Meanwhile, the fuel N adhered the facing plate 4 is warmed and volatilized by the flame injecting from the flame ejection opening 3*a*.

Thus, according to the ignition device 40 of the embodiment, the volatilization of the fuel N can be promoted and the burning around the ignition device 40 can be stabled after ignition.

Fifth Embodiment

Next, a fifth embodiment of the invention will be described. Even in the description of the embodiment, portions similar to those of the above-described first embodiment are omitted or are simplified.

Figure 6:
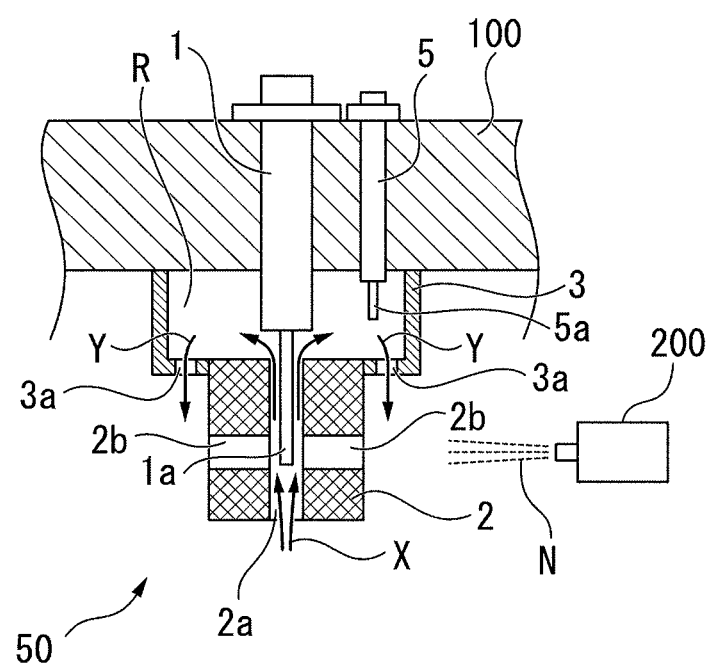
FIG. 6 is a cross-sectional view illustrating a schematic configuration of an ignition device of a fifth embodiment of the invention.

FIG. 6 is a cross-sectional view illustrating a schematic configuration of an ignition device 50 of the embodiment. As shown in the view, in the ignition device 50 of the embodiment, a second glow plug 5 is installed at the stagnation area R enclosed by the surrounding wall 3.

Similar to the glow plug 1, the second glow plug 5 projects downward from the installation unit 100 of the ignition device 50 itself and has a tip 5*a* (a second heat generation region) that functions as a heat generation region that generates heat above the ignition temperature of mixture Y at the end thereof.

In other words, the ignition device 50 of the embodiment includes the tip 5*a* of the second glow plug 5 functioning as the heat generation region installed at the stagnation area R. In addition, a spark plug can also be used instead of the glow plug 1.

According to the ignition device 50 of this embodiment employing the above-described configuration, since the mixture Y flowed into the stagnation area R is again heated to above the ignition temperature inside the stagnation area R, the ignition performance can be improved further than a case where a single glow plug 1 is installed.

Sixth Embodiment

Next, a sixth embodiment of the invention will be described. Even in the embodiment, portions similar to those of the above-described first are omitted or are simplified.

Figure 7A:
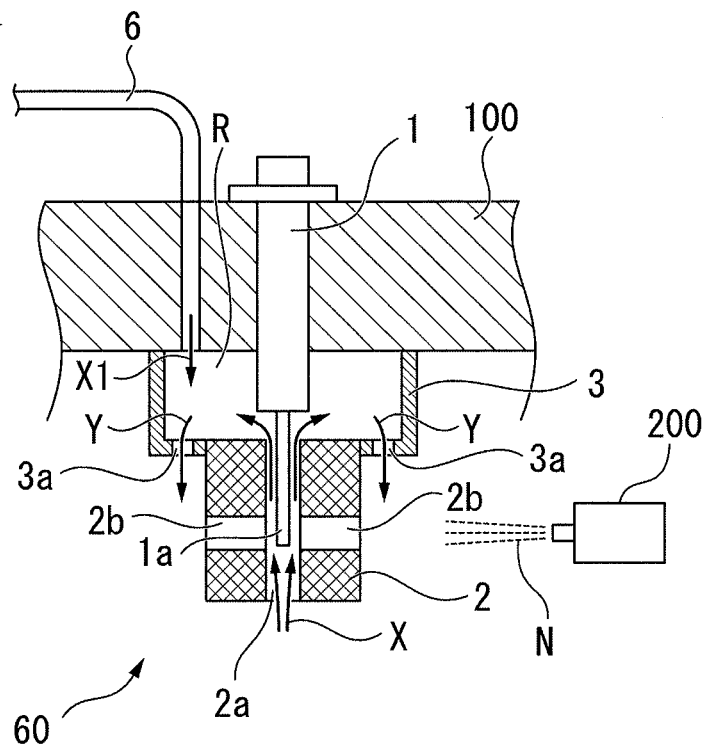
FIG. 7A is a cross-sectional view illustrating a schematic configuration of an ignition device of a sixth embodiment of the invention.

FIG. 7A is a cross-sectional view illustrating a schematic configuration of an ignition device 60 of the embodiment. As shown in the view, the ignition device 60 of the embodiment includes an air supply unit 6 supplying air X1 to the tip 1*a* of the glow plug 1 via the stagnation area R.

According to the ignition device 60 of the embodiment employing the above-described configuration, it is possible to enhance the oxygen concentration of the mixture Y supplied to the tip 1*a* of the glow plug 1 and to further improve the ignitability.

Figure 7B:
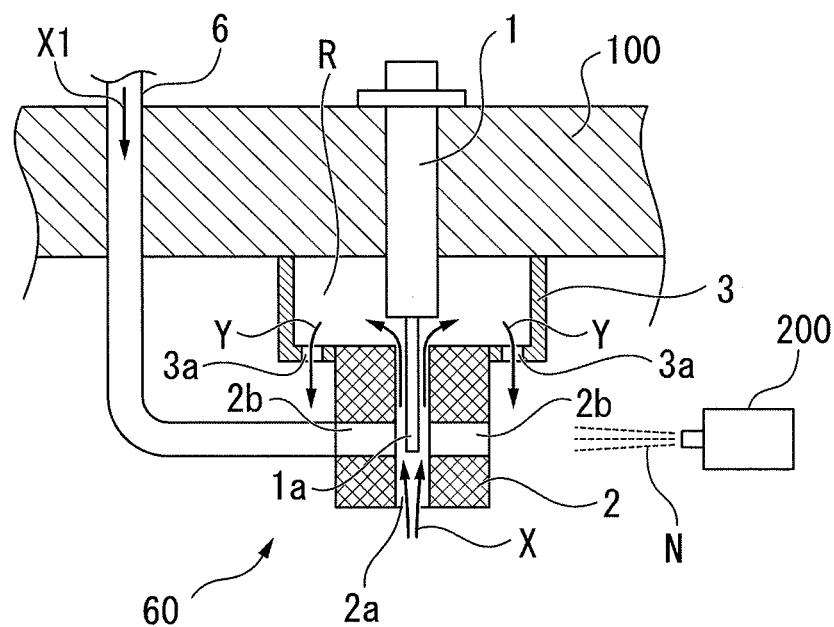
FIG. 7B is a cross-sectional view illustrating a schematic configuration of the ignition device of the sixth embodiment of the invention.

In addition, as shown in FIG. 7B, the air supply unit 6 may be connected to the through hole 2*b*. Also, the air supply unit 6 may be connected to the through hole 2*c*.

Even in a case where the above-described configuration is employed, it is possible to enhance the oxygen concentration of the mixture Y supplied to the tip 1*a* of the glow plug 1 and to further improve the ignitability.

Seventh Embodiment

Next, an ignition sequence to the ignition device of the above-described embodiment as a seventh embodiment of the invention will be described.

In addition, the ignition sequence is integrated by a control unit (not shown) including a timer function. In addition, in the embodiment, a temperature sensor measuring the temperature surrounding the ignition device is installed and the ignition is performed in an environment where a detection signal of the temperature sensor is input to the control unit.

Figure 8:
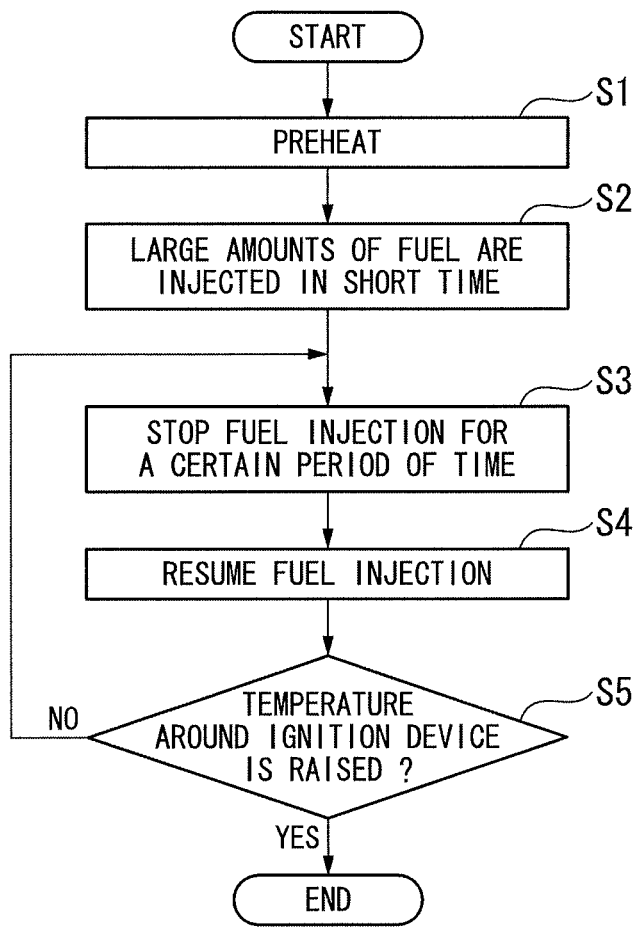
FIG. 8 is a flowchart explaining an ignition sequence to the ignition device of the invention.

FIG. 8 is a flowchart explaining the ignition sequence of the embodiment. The following description is described with reference with the flowchart of FIG. 8.

First, the control unit preheats the tip 1*a* of the glow plug 1 (step S1). In addition, as the above-described fifth embodiment, in a case where the second glow plug 5 is installed, the tip 5*a* of the second glow plug 5 is also preheated.

The control unit then performs control of the fuel ejection device 200 and large amounts of fuel are ejected in a short time (step S2). In addition, the amount of fuel ejected and the ejection time in step S2 are set based on a test or the like beforehand, and stored in the control unit.

Next, the control unit stops the fuel ejection for a certain period of time (step S3). As described above, the fuel ejection stops for a certain period of time so that the development of the flame kernel that is formed when fuel is ejected in step S2 can be promoted.

And then, the control unit resumes the fuel ejection (step S4). At this time, the flame kernel is developed and stable in step S3, and the fuel is supplied again so that it is less likely to misfire. Thus, it is possible to develop the flame kernel even larger.

Finally, the control unit measures the temperature around of the ignition device 10 (step S5), in a case where the temperature around of the ignition device 10 is raised, the ignition sequence is finished as the ignition is successful and in a case where the temperature around of the ignition device 10 is not raised, the sequence returns to step S3 again as the ignition is not performed.

In addition, in a case where the fuel holding unit 2 is wet with fuel before vaporization, during subsequent heating, fuel wetting the fuel holding unit 2 is first vaporized and then ejected from the fuel holding unit 2. Thus, until the wet fuel is discharged outside the fuel holding unit 2, because of force of the ejection of the vaporized fuel, oxygen (exhaust gas) cannot flow into the fuel holding unit 2 and the ignition time is late.

Accordingly, it is preferable that, after the ignition sequence is finished, and the filter regeneration process be finished and assimilated, a process for drying the fuel holding unit 2 by heating the fuel holding unit 2 to a certain temperature which does not ignite the fuel holding unit 2 is provided.

Eighth Embodiment

Next, an eighth embodiment of the invention will be described. Even in the embodiment, portions similar to those of the above-described first embodiment are omitted or are simplified.

Figure 9A:
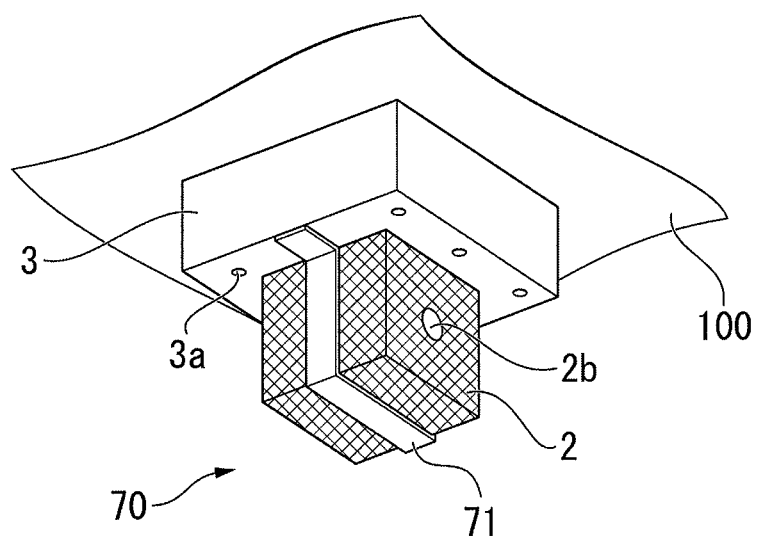
FIG. 9A is a perspective view illustrating a schematic configuration of an ignition device of an eighth embodiment of the invention.

FIG. 9A is a perspective view illustrating a schematic configuration of an ignition device 70 of the embodiment. As shown in the view, the ignition device 70 of the embodiment includes a band unit 71 supporting the fuel holding unit 2. The band unit 71 is fixed to the surrounding wall 3 and supports the fuel holding unit 2 from below.

According to the ignition device 70 of the embodiment having the above-described configuration, since the fuel holding unit 2 is supported by the band unit 71, the band unit 71 can prevent the fuel holding unit 2 from detaching.

In addition, a shape of the band unit 71 is an example and may be changed. For example, the width of the band unit 71 may be set to the width of the fuel holding unit 2.

Ninth Embodiment

Next, a ninth embodiment of the invention will be described. In addition, an ignition device 80 of the embodiment is a modified example of the ignition device 70 of the above-described eighth embodiment. In the following description, differences with the ignition device 70 will be described.

Figure 9B:
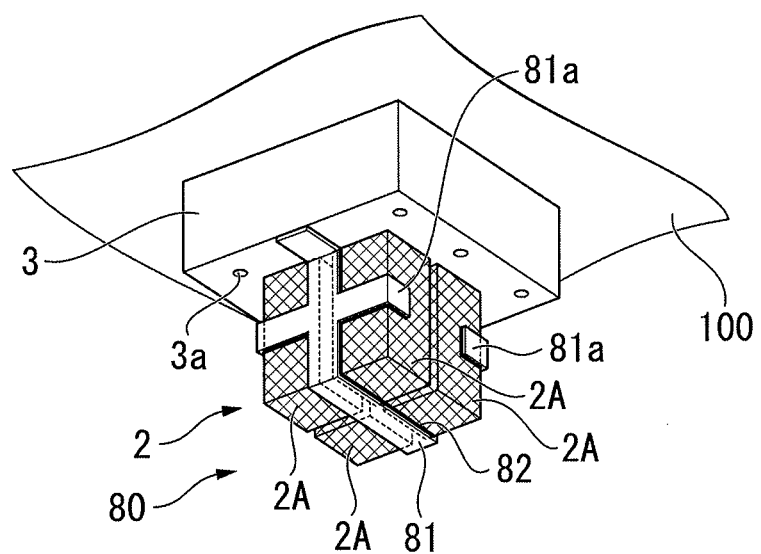
FIG. 9B is a perspective view illustrating a schematic configuration of an ignition device of a ninth embodiment of the invention.

FIG. 9B is a perspective view illustrating a schematic configuration of the ignition device 80 of the embodiment. As shown in the view, in the ignition device 80 of the embodiment, the fuel holding unit 2 is divided by four small pieces 2A.

Thus, the ignition device 80 includes a band unit 81 having claw units 81a for holding the divided fuel holding unit 2 instead of the band unit 71 of the above-described eighth embodiment.

In addition, as shown in FIG. 9B, the ignition device 80 of the embodiment arranges a heat-resisting cushion material 82 between the band unit 81 and the fuel holding unit 2. As the cushion material 82, for example, ceramic fibers can be used.

According to the ignition device 80 of the embodiment having the above-described configuration, since the fuel holding unit 2 is divided, even in a case where a shape of the fuel holding unit 2 is changed by thermal contraction, the stress acting upon the fuel holding unit 2 can be decreased.

Furthermore, according to the ignition device 80 of the embodiment, since the heat-resisting cushion material 82 is installed between the band unit 81 and the fuel holding unit 2, change of the shape of the fuel holding unit 2 due to expansion can be avoided due to contraction of the cushion material 82 and the stress acting on the fuel holding unit 2 can be decreased.

In addition, the division shape of the fuel holding unit 2 is an example and it may be changed. For example, the fuel holding unit 2 may be further divided into small pieces.

Hereinbefore, preferred embodiments of the invention has been described with reference with drawings, however the invention is not limited to the above-described embodiments. Various shapes, combinations thereof or the like of each configuration member illustrated in the above-described embodiments are an example and various modifications can be made based on design requirements or the like in a scope of the invention without departing from the gist of the invention.

INDUSTRIAL APPLICABILITY

As described above, according to the invention, the ignitability of the ignition device which ignites to the mixture including the oxidizer and the fuel can be improved.

REFERENCE SIGNS LIST 10, 20, 30, 40, 50, 60, 70, 80: ignition device
1: glow plug (heating element)
1a: tip (heat generation region)
2: fuel holding unit
2a: through hole
2b: through hole (second through hole)
2c: through hole
3: surrounding wall
3a: flame ejection opening
4: facing plate
5: second glow plug
5a: tip (second heat generation region)
6: air supply unit
N: fuel
X: oxidizer
X1: air
Y: mixture
R: stagnation area (space)
100: installation unit
200: fuel ejection device
71, 81: band unit
82: cushion material
2A: small piece

The invention claimed is:

1. An ignition device that ignites a mixture including an oxidizer and fuel comprising:
an installation unit;
a surrounding wall that is provided at a lower side of the installation unit and surrounds a space;
a heating element that projects downward from the installation unit and has a heat generation region generating heat to a temperature above an ignition temperature of the mixture at a lower end thereof;
a fuel holding unit that is provided at a lower side of the surrounding wall and encloses the heat generation region; and
a fuel ejection device that ejects the fuel toward the fuel holding unit from a position lateral to the fuel holding unit, wherein
the installation unit, the surrounding wall and the fuel holding unit are positioned in series in an upper-and-lower direction;
a through hole that vertically passes through the fuel holding unit is provided at the fuel holding unit, and the heat generation region is inserted into an upper end of the through hole and is enclosed by the fuel holding unit;
the upper end of the through hole is opened to a lower end of the space and thereby the fuel holding unit communicates with the space;
the surrounding wall having a flame ejection opening that connects the space to outside of the ignition device and is provided at an upper side of the fuel holding unit; and
wherein an ascending current of the mixture generated in the through hole by heating the heat generation region flows into the space through the upper end of the through hole and the lower end of the space, and flame formed in the space by igniting the mixture ejects to the outside of the surrounding wall via the flame ejection opening.

2. The ignition device according to claim 1, wherein the fuel holding unit includes a second through hole that is opened to a side surface thereof in which the fuel is injected by the fuel ejection device, and wherein the second through hole communicates with the heat generation region.

3. The ignition device according to claim 2, wherein the second through hole has a diameter larger than that of the through hole.

4. The ignition device according to claim 2, wherein the second through hole passes through to a side surface of the fuel holding unit that is opposite to the side surface where the fuel is injected, and the ignition device further includes a facing plate that is installed facing to an opening of the second through hole that is opened to the side surface of the fuel holding unit that is formed opposite to the side surface where the fuel is injected.

5. The ignition device according to claim 1, wherein the flame ejection opening is biased and formed to a side where the fuel is injected to the fuel holding unit.

6. The ignition device according to claim 1, further includes a second heat generation region that is installed in the space.

7. The ignition device according to claim 1, further includes an air supply unit that supplies air to the heat generation region.

8. The ignition device according to claim 1, further includes a band unit that supports the fuel holding unit.

9. The ignition device according to claim 8, wherein the fuel holding unit is divided in a plurality of small pieces.

10. The ignition device according to claim 8, further includes a cushion material that is installed between the fuel holding unit and the band unit.

11. The ignition device according to claim 1, wherein the fuel holding unit is configured by porous bodies.

12. The ignition device according to claim 1, wherein the space surrounded by the surrounding wall forms a stagnation area that is connected to the flame ejection opening.

* * * * *